(12) United States Patent
Tahon et al.

(10) Patent No.: US 8,246,836 B2
(45) Date of Patent: Aug. 21, 2012

(54) PROCESS FOR TREATING SUBSTANCES CONTAMINATED BY HEAVY METALS

(75) Inventors: Christine Tahon, Mons (BE); Guy Depelsenaire, Liege (BE); Patrick Sharrock, Toulouse (FR); Ange Nzihou, Albi (FR)

(73) Assignee: SOLVAY (Societe Anonyme), Brussels (BE)

( * ) Notice: Subject to any disclaimer, the term of this patent is extended or adjusted under 35 U.S.C. 154(b) by 436 days.

(21) Appl. No.: 12/526,012

(22) PCT Filed: Feb. 5, 2008

(86) PCT No.: PCT/EP2008/051390

§ 371 (c)(1),
(2), (4) Date: Aug. 5, 2009

(87) PCT Pub. No.: WO2008/095921

PCT Pub. Date: Aug. 14, 2008

(65) Prior Publication Data

US 2010/0006506 A1    Jan. 14, 2010

(30) Foreign Application Priority Data

Feb. 9, 2007   (FR) .................................... 07 53176

(51) Int. Cl.
*C02F 1/42* (2006.01)
(52) U.S. Cl. ..................................................... 210/688
(58) Field of Classification Search .................... 210/688
See application file for complete search history.

(56) References Cited

U.S. PATENT DOCUMENTS

| | | | |
|---|---|---|---|
| 2,605,229 A | 7/1952 | Marcus | |
| 3,027,229 A | 3/1962 | Towey et al. | |
| 3,925,545 A | 12/1975 | Relyveld | |
| 5,857,810 A | 1/1999 | Cantrell et al. | |
| 5,926,771 A | 7/1999 | Brown | |
| 6,416,252 B1 | 7/2002 | Moore | |
| 6,592,294 B1 | 7/2003 | Moore | |
| 6,962,119 B2 | 11/2005 | Criado et al. | |
| 7,128,006 B2 | 10/2006 | Criado et al. | |
| 2003/0070688 A1 | 4/2003 | Aoki et al. | |
| 2005/0226939 A1 | 10/2005 | Ramalingam et al. | |

FOREIGN PATENT DOCUMENTS

| | | |
|---|---|---|
| EP | 801971 A1 | 10/1997 |
| FR | 2181426 A | 12/1973 |
| FR | 2739793 A1 | 4/1997 |
| JP | 2002177738 A | 6/2002 |
| JP | 2003190942 A | 7/2003 |
| JP | 2005075722 A | 3/2005 |
| RU | 2209665 C1 | 8/2003 |
| WO | WO9717285 A1 | 5/1997 |
| WO | WO0026153 A1 | 5/2000 |
| WO | WO03072496 A1 | 9/2003 |
| WO | WO2005058457 A1 | 6/2005 |
| WO | WO2005107927 A2 | 11/2005 |

OTHER PUBLICATIONS

Jeanjean, et al., Sorption of uranium and other heavy metals on hydroxyapatite, J. Radioanal. Nucl. Chem., Letters 201 (6) 529-539 (1995).*
U.S. Appl. No. 11/117,297, filed Apr. 29, 2005, Claude Criado et al.
U.S. Appl. No. 10/450,043, filed Oct. 29, 2003, Claude Criado et al.
Lester John N. Heavy Metals in Wastewater and Sludge Treatment Processes ;vol. I, 1987; p. 2; CRC Press Inc ISBN 0-8493-4667-3 (Set), ISBN 0-8493-4668-1 (vol. I)—3 pp.

* cited by examiner

*Primary Examiner* — Chester Barry
(74) *Attorney, Agent, or Firm* — Beatrice C. Ortego

(57) ABSTRACT

Process for treating substances contaminated by heavy metals, according to which a calcium phosphate gel is produced and is brought into contact with the contaminated substances.

21 Claims, No Drawings

PROCESS FOR TREATING SUBSTANCES CONTAMINATED BY HEAVY METALS

CROSS-REFERENCE TO RELATED APPLICATIONS

This application is a U.S. national stage application under 35 U.S.C. §371 of International Application No. PCT/EP2008/051390 filed Feb. 5, 2008, which claims priority to French Application No. 0753176 filed Feb. 9, 2007, these applications being herein incorporated by reference in their entirety for all purposes.

The invention relates to a process for treating substances (solid, liquid or gaseous media) contaminated by heavy metals.

The problems posed by the impact of heavy metals in the environment are well known. Numerous industrial processes release liquid or gaseous effluents, or solid waste, that are heavily loaded with heavy metals. The expression "heavy metals" is understood to mean metals whose density is at least equal to 5 g/cm$^3$, and also beryllium, arsenic, selenium, and antimony, in accordance with the generally accepted definition (Heavy Metals in Wastewater and Sludge Treatment Processes; Vol I, CRC Press Inc; 1987; page 2). Lead is one particularly significant example, given its harmful effect on the human body. For example, during the combustion of many wastes, especially household waste, vaporization of heavy metals occurs, these vapours being entrained in the combustion flue gases. To avoid contaminating the environment, it is necessary to provide flue gas treatment processes capable of carrying out effective scrubbing of heavy metals. The toxic substances removed from the flue gas when it is being purified are found in a residue which itself must often be treated before being able, for example, to be discharged or utilized. This is because, although the purification residue which contains the heavy metals from the flue gas is subjected, for example, to the action of rain that is acidic when it is discharged, it frequently releases some of the heavy metals that it contains into the environment. This can then cause pollution of the subsoil (water tables). It is therefore essential that the heavy metals be immobilized in the purification residue.

Described in Application FR 2739793, is a process for treating dust or flue gas purification residues according to which an aqueous extraction of the waste is carried out by phosphoric acid or an acidic calcium phosphate followed by the formation of a calcium phosphate gel having a neutral or basic pH. This gel is converted to a solid by drying and/or calcining. This process has the drawback that the gel must be formed in the presence of the waste, which hampers the separate industrial production of the reagent. It also has the drawback of requiring a drying and/or calcining operation. Lastly, it requires the use of corrosive reagents (limewater and phosphoric acid), the storage and handling of which are dangerous. The invention aims to provide a reagent for the purification of substances such as effluents, soil or waste contaminated with heavy metals which is simple and economical to produce and which makes it possible to immobilize the heavy metals in the purification residue.

It is based on the idea of taking advantage of the thixotropic nature of calcium phosphate gels in order to be able to use such gels that are formed beforehand (and not in situ) possibly several days or even several weeks in advance. Due to their thixotropic nature, it is sufficient to stir these gels before being able to use them in pollution control (for example by spraying them into the gases to be treated, by injecting them into contaminated soil or by mixing them into a contaminated liquid). The problem of possibly having to handle corrosive reagents may therefore be moved from the pollution control installation to a specific unit.

Another advantage of this way of proceeding is that it makes it possible, in fact, to advantageously utilize sources of Ca ions which are themselves waste and, therefore, to treat said waste as and when it is produced (since the gel which results therefrom can easily be stored before use). Thus, the Applicant has several sources of Ca-containing waste available in its industrial installations (ultra)fines (particles of very small size) of crude quarried limestone, solid particles derived from the process for manufacturing PCC (precipitated calcium carbonate) and fine particles derived from the carbonatation of DS liquid (residual brine from soda ash factory containing fine particles in suspension) which are, for the time being, stored in settling basins or ditches. These sources of Ca can be used as is in the process according to the invention.

The fact that the gel can be used as is (optionally with prior stirring to give it back its fluidity) is a definite economic advantage. This advantage can be strengthened on the condition of choosing, as a source of phosphate ions, compounds that are commercially available such as phosphate fertilizers or phosphoric acid, for example.

Consequently, the invention relates to a process for treating substances contaminated by heavy metals, according to which a calcium phosphate gel is produced and is brought into contact with the contaminated substances.

In particular, it relates to a process for treating substances contaminated by heavy metals, according to which:
  use is made of a source of calcium carbonate and a source of phosphate ions in water in a weight ratio that is controlled so as to obtain a Ca/P ratio between 1.4 and 1.8;
  the calcium carbonate is reacted with the phosphate ions at a pH between 2 and 10 and with controlled stirring to give rise to a calcium phosphate gel;
  this gel is brought into contact with the contaminated substances.

It has turned out that the reagent obtained by the process according to the invention has an interesting structure. It comprises very fine particles, whose average diameter $D_{50}$ is less than 10 μm, preferably less than 5 μm, in particular less than 1 μm. This diameter is, however, preferably greater than 0.1 μm. These particles are composed of calcium phosphate, the structure of which is intermediate between tricalcium phosphate and calcium phosphate hydroxyapatite. These particles then naturally evolve towards an apatitic structure.

The term "apatite" denotes a family of mineral compounds whose chemical formula can be written in the following general form:

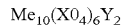

$$Me_{10}(XO_4)_6Y_2$$

In this formula, Me generally represents a divalent cation ($Me^{2+}$), $XO_4$ a trivalent anionic group ($XO_4^{3-}$) and Y a monovalent anion ($Y^-$).

Calcium phosphate hydroxyapatite $Ca_{10}(PO_4)_6(OH)_2$ crystallizes in the space group of the hexagonal system. This structure is composed of a close-packed quasi-hexagonal stack of $XO_4$ groups, forming two types of parallel tunnels.

The existence of these tunnels gives apatites chemical properties akin to those of zeolites. Holes may also be created either by the departure of anions and cations, or by the presence of cations or anions of different valency. Apatites therefore appear to be particularly stable structures which may tolerate large gaps in their composition.

The hydroxyapatite should not be confused with the tricalcium phosphate (TCP), which has a similar weight composition: $Ca_3(PO_4)_2$. The Ca/P ratio of the TCP is 1.5 whereas it is 1.667 for the hydroxyapatite. Industrial apatites sold as food additives or mineral fillers are, as a general rule, variable mixtures of TCP and hydroxyapatite.

Other salts of calcium and phosphate, including TCP, do not have the same properties as the hydroxyapatite. Although TCP can also react with heavy metals, the hydroxyapatite is more advantageous as it encloses the metals in the form of an insoluble, and therefore relatively inert, matrix.

In this document, the term "gel" is understood to mean a thixotropic aqueous suspension comprising at least one solid dispersed in colloidal form in the aqueous phase, preferably having a viscosity of at least 100 cps, most particularly preferably of at least 200 cps. The dispersed particles form space lattices, stabilized by means of van der Waals forces. The gel is thixotropic, that is to say that when it is subjected to a shear stress its viscosity decreases, but returns to its initial value when the shear stress stops. The physical property of thixotropy is more particularly defined as follows: left at rest, the thixotropic fluid will be restructured until it has the appearance of a solid (infinite viscosity), whereas under a constant stress that is high enough to break up the structure formed at rest for example, the fluid will be broken down until it is in its liquid state (low viscosity).

The reagent obtained by the process according to the invention, which is in the form of a gel, comprises particles whose structure is intermediate between TCP and apatite. They are only partially crystallized. Intense stirring is one parameter that favours the rapid obtention of the gel according to the invention. It has been observed that when this stirring is very intense, it makes it possible to obtain the gel more rapidly. At the end of the reaction, when the gel appears, the viscosity of the aqueous suspension increases substantially, to reach a value generally of at least 100 cps, preferably of at least 200 cps. In practice, the stirring time and intensity will be adapted (optionally in an iterative manner) in order to obtain a gel which is effectively solidified (i.e. it has a specific form and no longer flows) when the stirring is stopped. Such a gel has an apatite precursor type structure, having a great capacity to trap heavy metals. Depending on the amount of water present during the reaction, it may be that an aqueous phase is exuded by the gel, which can easily be removed by settling. However, preferably, the amount of water will be adapted to prevent the formation of such an aqueous phase.

In one preferred variant of the process according to the invention, when the source of phosphate ions is a fertilizer, the stirring is controlled so as to obtain, in less than 60 minutes, a gel whose particles are apatite precursors. The viscosity increase, signature of the conversion of the aqueous suspension to a gel, therefore indicates the fact that the reaction effectively takes place. The crystal structure of the particles obtained in this variant then develops more rapidly towards that of apatite, at a rate which depends, in particular, on the temperature at which they will be heated.

In another preferred variant, when the source of phosphate ions is phosphoric acid, it is possible to further reduce the stirring time (for example, even to less than a minute).

In one advantageous embodiment of this variant, the stirring is carried out by means of a blade rotating in the container in which the process is carried out, the rotational speed being at least 2500 rpm, advantageously at least 5000 rpm and preferably at least 7500 rpm.

The reaction advantageously takes place at atmospheric pressure and/or at ambient temperature. The use of hydrothermal bombs is therefore not necessary. During the reaction, in one advantageous embodiment, the temperature is kept between 15 and 80° C., preferably between 20 and 75° C., more particularly between 20 and 30° C. In this variant of the process according to the invention, the possibility of carrying out the reaction at temperatures close to ambient temperature constitutes an additional advantage.

Control of the pH during the essential steps of the reaction may constitute a critical parameter of the invention (depending on the method of introducing the reagents). During the formation of the reagent, the pH must be kept between 2 and 10, preferably between 5 and 10, or even between 6.5 and 9, more preferably between 7 and 8. Control of the pH is achieved by addition of suitable amounts of acids and bases. For this purpose, it is recommended to use phosphoric acid or alkali metal phosphates.

Alternatively, it is possible to mix, from the start, the total amount of reactants and allow the pH to change naturally as the reaction takes place. When starting from phosphate fertilizers, the pH thus generally changes from a pH close to 5 at the start of the reaction to a pH close to 8 at the end of the reaction. And when starting from phosphoric acid, it changes from pH 2 to pH 8 (approximately).

In the process according to the invention, a source of calcium carbonate is used. The expression "source of calcium carbonate" is understood to mean a composition containing substantial amounts of calcium carbonate, advantageously at least 10% by weight. The source of calcium carbonate may be mainly composed of calcium carbonate. Advantageous sources are natural minerals that are abundantly available and rich in $CaCO_3$ such as chalk, marble or dolomite. In the case where the source of $CaCO_3$ contains large amounts of impurities or other mineral substances, the aqueous suspension obtained by the process according to the invention will contain hydroxyapatite dispersed in one or more other substances, which may be an advantage in certain cases. Finally, according to one particularly advantageous variant already mentioned above, the source of calcium carbonate comprises at least one waste product from a soda ash factory.

It is advantageous that the source of calcium carbonate be in the form of a powder having a fine particle size. In one recommended variant, the average diameter of the particles of the powder is less than 300 µm, advantageously less than 200 µm and preferably less than 100 µm. The average diameter in question is the $D_{50}$, that is to say the diameter such that 50% by weight of the particles have a diameter less than said value. In the case of crude limestones fines (which have an average diameter close to 0.4 mm), this may involve prior milling in order to achieve the desired particle size.

It is possible to use phosphate ions of natural origin, in particular obtained from fish or mammal bones. The phosphate deposits (ores) mined for extracting phosphoric acid are generally fluorinated apatites containing numerous metallic impurities. These phosphates originate from bone deposits aged under geological conditions linked to burial sites. It is recommended, however, to use phosphoric acid or water-soluble phosphate salts. In one advantageous embodiment, the source of phosphate ions comprends a monoanionic phosphate salt, such as ammonium hydrogen phosphate ($NH_4H_2PO_4$) or potassium or sodium hydrogen phosphate ($KH_2PO_4$ or $NaH_2PO_4$). Sodium or potassium hydrogen phosphates are preferred as they are available in the form of commercial fertilizers that are relatively inexpensive and that do not generate a stream of aqueous ammonia (that it would then be necessary to treat).

The gel obtained by the process according to the invention generally comprises at least 15% by weight of solids (without which this would no longer be a gel in fact, but an aqueous suspension). It is recommended that it does not comprise more than 33%, in order that it remains easy to pump, does not consume too much energy on stirring and does not overly hamper the gelling process.

This gel comprises fine, apatite precursor, calcium phosphate particles which have turned out to have a great capacity to absorb heavy metals and an excellent potential for evolving to apatite, whose properties ensure a good stability over time and that the metals are effectively rendered inert. The inventors consider that these advantageous properties are promoted by intense stirring produced in the reaction medium, which favours the appearance of numerous microparticle nucleation seeds.

It is also possible to dilute the gel in water to form a simple aqueous suspension.

On the other hand, it is possible to dry the suspension, preferably by spray drying, in order to obtain a powder of apatite precursor, calcium phosphate particles. Such a powder has proved to have a high specific surface area, greater than $100 \, m^2/g$, measured by the BET technique. It should be noted, in this regard, that the fact of vaporizing the gel by the process according to the invention in a gaseous effluent is, in fact, equivalent to spray drying and, as explained above, its purifying action of said effluent is particularly effective in view of the advantageous particle size distribution obtained in situ.

The gel according to the invention or an aqueous suspension and similarly a powder obtained from the gel have numerous applications in the field of the environment, in particular for treating liquid or gaseous effluents, soil or waste contaminated with heavy metals.

The invention therefore also relates to a process for treating flue gases containing heavy metals, according to which a gel of calcium phosphate particles is dispersed in the flue gases, the flue gases being at a temperature above 100° C., the resulting mixture then being filtered. It is recommended that the aqueous suspension be composed from a calcium phosphate gel obtained by the process according to the invention. The gel may either be dispersed as is in the flue gases, or be diluted in water first. In the process for treating flue gases according to the invention, the temperature of the flue gases is advantageously between 120 and 350° C., preferably between 150 and 250° C. After a sufficient contact time of the flue gas with the suspension or gel, preferably between 1 and 10 seconds, the flue gas is subjected to a dedusting operation. The residue collected at the end of the dedusting operation is then highly loaded with heavy metals, absorbed in the apatite precursor. During storage of the residue, the precursor is converted to actual apatite, which is then very resistant to leaching.

In one recommended variant of the process for treating flue gases according to the invention, in particular when the flue gases contain acid compounds, the aqueous suspension of calcium phosphate is injected in the presence of an alkaline reagent, such as lime, sodium carbonate, sodium bicarbonate or trona. Sodium-based reagents are advantageous.

The invention also relates to a process for treating liquid effluents containing heavy metals, according to which a calcium phosphate gel, possibly being obtained by the process according to the invention, is mixed in the effluent, and this for a sufficient duration so that the calcium phosphate absorbs the heavy metals and the mixture is clarified in order to produce a liquid that is purified of heavy metals on the one hand, and a residue comprising calcium phosphate loaded with heavy metals on the other hand, which are separated. The gel may be used as is or be diluted in water first. The liquid effluent is advantageously water contaminated by heavy metals, although other liquids can be treated by the process. The clarification may be obtained by filtration or by simple settling, calcium phosphate generally having a flocculating action. The mixing time depends on many factors and must be determined case by case, in order to obtain sufficient absorption of the heavy metals in the calcium phosphate. In the case of phosphate fertilizers, it is recommended, however, that the mixing time be longer than 15 minutes, preferably 30 minutes. It is generally pointless for this time to be longer than 60 minutes. In the case of phosphoric acid, the stirring may be stopped earlier. As for the flue gas treatment process, it is advantageous to subject the treatment residue to a maturing step in order that the apatitic structure is completely formed and that the residue becomes inert with respect to leaching.

The invention finally relates to a process for treating solid residues or soil contaminated by heavy metals, according to which a calcium phosphate gel, possibly being obtained by the process according to the invention, is injected into the residue or soil in the vicinity of contaminating heavy metals.

It is observed that the injection, for example into the soil, of a calcium phosphate gel in the vicinity of the contaminating heavy metals has a two-fold advantage. On the one hand, calcium phosphate gels, and in particular those obtained by the process according to the invention, have proved to have a high impermeability to heavy metals. The injection of barriers formed from such gels therefore makes it possible to confine these pollutants in the soil. The injection may, for example, be carried out in the form of narrowly spaced columns by the vibrated thin shell technique, commonly used to inject cement grouts into the ground. Since the gel is thixotropic, on the one hand the calcium phosphate barrier does not diffuse into the soil too much (owing to its high viscosity under low shear conditions), which makes it possible to obtain columns, the concentration and effectiveness of which is maintained over time. On the other hand, the flow of the gel during the actual injection is made easier (owing to its low viscosity under high shear conditions). Finally, calcium phosphate gels, and in particular those obtained by the process according to the invention trap heavy metals effectively. The heavy metals which could have a tendency to cross the barrier find themselves permanently immobilized therein. The process according to the invention make it possible to treat (or rather: to prevent heavy metals from leaching into the environment from) any solid residue, preferably stored in large amounts, such as municipal waste disposal sites or others.

The examples, the description of which follows, serve to illustrate the invention.

In these examples, the heavy metal contents of the substances in the solid state were measured in the following manner.

A sample of the substance to be analysed (around 200 mg) had 1 ml of 65% Suprapur nitric acid and 3 ml of 37% Suprapur hydrochloric acid added to it, then it was subjected to microwave radiation in a hermetically-sealed container in order to mineralize it (destruction of the (hydro)carbon matrix in order to obtain a mineral residue containing the analytes).

This solution, with the addition of an internal standard (scandium) was made up to volume (50 ml) with ultrapure water.

The solution to be analysed was then filtered if necessary (0.45 μm) and injected in the form of an aerosol into an argon plasma sustained by inductive coupling. At temperatures of 6 000 to 8 000 K, the atoms and ions formed from the sample were excited and returned to the ground state by emitting radiation with wavelengths characteristic of the element in the UV/visible range (130 nm to 800 nm) (ICP OES).

The various radiation wavelengths were separated by diffraction on a grating having a large number of lines and the intensity of the chosen lines was measured.

The concentration of the target elements in the measurement solution was obtained after calibrating the instrument with solutions of known concentrations of each of the target elements. The concentration of these elements in the starting sample was then calculated taking into account the dilution performed during the various preparation steps.

EXAMPLE 1

204 g of $KH_2PO_4$ was introduced into a receptacle containing 0.750 l of water at an ambient temperature of 20° C. After gentle stirring, 250 g of $CaCO_3$ having an average particle size of 200 μm were introduced into the receptacle. The assembly was then stirred for 30 minutes using an Ultra Turrax machine equipped with an S25 KV25F spindle. This spindle was equipped at its submerged end with a rotor having an outer diameter of 18 mm, inserted into a stator having an outer diameter of 25 mm. The "gap" between the rotor and the stator was 0.5 mm. The rotor rotated at a speed of 9500 rpm. During the stirring, the pH was stabilized at 7.5. At the end of the stirring, a calcium phosphate gel was obtained containing 33% of solids and whose viscosity was 300 centipoise.

EXAMPLE 2

The gel obtained in Example 1 was dried by spray drying under a pressure of 4 bar. The air inlet temperature was 190° C., the outlet temperature 75° C. A calcium phosphate powder was obtained having a BET specific surface area of 130 m²/g, and a $D_{50}$ diameter of 10 μm.

By way of comparison, this same gel subjected to a washing step, filtration, then drying at 60° C. (to constant weight) followed by another washing step, drying at 105° C. (again to constant weight) and finally milling in a ball mill gave a calcium phosphate powder having a BET specific surface area of 120 m²/g, and a $D_{50}$ diameter of 32 μm, which is less favourable.

EXAMPLE 3

Ash resulting from the incineration of waste rich in heavy metals was collected. The heavy metal composition of the ash, measured after attack of the ash with hydrofluoric, hydrochloric and nitric acid (according to the NF EN 13657 standard, but modified in a way such that the Aqua Regia is replaced by 1 ml of supra-pure HNO3, 3 ml of supra-pure HCl and 1 ml of supra-pure HF), is given in Table 1. The ash is subjected to a leaching operation in 0.5M acetic acid, in a L/S ratio of 20 for 24 h, while stirring at 15 rpm. At the end of the leaching operation, a liquor is obtained, of which the content of the various heavy metals is given in Table 2 (all the results given in this table are the average of two tests). Added next to the liquor was an amount of 5.81 g/l of the reagent in the form of the gel obtained in Example 1. The assembly was mixed for 30 min. At the end of this period, the reagent and some of the heavy metals underwent flocculation and settling. The heavy metal composition of the supernatant liquor was then analysed. The results are given in Table 2. It is observed that only 43.5% of the heavy metals initially present in the liquor are found in the supernatant liquor.

TABLE 1

| Metal | Content (mg/kg of solids) |
|---|---|
| As | 51 |
| Cd | 210 |
| Cr | 270 |
| Cu | 1000 |
| Hg | 1.2 |
| Ni | 66 |
| Pb | 8300 |
| Zn | 15000 |
| Total | 24898 |

TABLE 2

| | Liquor as is (mg/l) | 5.81 g/l reagent | 11.27 g/l reagent | 18.05 g/l reagent |
|---|---|---|---|---|
| As | 0.5 | 0.625 | 0.93 | 0.96 |
| Cd | 11.5 | 9 | 6.35 | 3.3 |
| Cr | 2.6 | 0.12 | <0.1 | <0.1 |
| Cu | 19.5 | 11 | 4.7 | 2.75 |
| Hg | $<5.0 \times 10^{-3}$ | $<5.0 \times 10^{-3}$ | $<5.0 \times 10^{-3}$ | $<5.0 \times 10^{-3}$ |
| Ni | 0.64 | 0.55 | 0.535 | <0.5 |
| Pb | 250 | 5.65 | 1.35 | 0.575 |
| Zn | 565 | 345 | 160 | 53.5 |
| Total (mg/l) | 849 | 371.95 | 173.91 | 61.68 |
| % heavy metals remaining | 100 | 43.51 | 20.34 | 7.21 |

EXAMPLES 4 AND 5

In these examples the procedure from Example 3 was followed, except that the amounts of reagent in gel form were respectively 11.27 and 18.05 g/l. The heavy metal compositions of the supernatant liquid are also given in Table 2. It is observed that only 20.3 and 7.2% respectively of the heavy metals initially present in the liquor remain in the supernatant, which confirms the effectiveness of the purification process according to the invention.

EXAMPLE 6

Not Conforming to the Invention

A charge of 200 kg of ash resulting from the incineration of waste rich in heavy metals was collected, originating from a different source to that of the preceding examples. Mixed with this charge, whose cadmium and lead content is given in Table 3, was an amount of 2 kg of PVC. The mixture was calcined at a temperature of 800° C. for one hour. The cadmium and lead contents of the calcined product were measured, the results being given in Table 3. The flue gases emitted during the calcination were filtered by means of a cyclone, then cooled to around 180° C. The lead and cadmium contents of the ash recovered in the cyclone were analysed. The results are given in Table 3. The filtered flue gases were then subjected to a purification treatment in which sodium bicarbonate was introduced into the cooled flue gas which was then filtered a second time. The bicarbonate used was BICAR® TEC 50 sodium bicarbonate sold by SOLVAY, milled to an average particle size of around 10 μm, at a rate of 4 kg/hour. The cadmium and lead content of the ash recovered in the second filter were then measured, the results being given in Table 3. Finally, the cadmium, lead and zinc contents of the flue gases were measured before and after the purification treatment according to the AFNOR XP X43-051 standard. The percentage abatement was deduced from the ratio of the contents before and after purification. The results are given in Table 4.

TABLE 3

|  | Charge (g/kg) | | Calcined product (g/kg) | | Cyclone ash (g/kg) | | Second filter ash (g/kg) | |
| --- | --- | --- | --- | --- | --- | --- | --- | --- |
|  | Pb | Cd | Pb | Cd | Pb | Cd | Pb | Cd |
| Example 6 | 7.694 | 0.334 | 5.890 | 0.457 | 5.642 | 0.520 | 12.932 | 1.027 |
| Example 7 | 7.025 | 0.551 | 1.285 | 0.093 | 5.518 | 0.360 | 22.037 | 1.353 |

TABLE 4

|  | Pb abatement | Cd abatement |
| --- | --- | --- |
| Example 6 | 89.6% | 86.2% |
| Example 7 | 90.4% | 97.8% |

EXAMPLE 7

Conforming to the Invention

The procedure of Example 6 was followed except that an amount of 100 g/h of apatite gel obtained by the process according to the invention were sprayed into the flue gases in addition to the bicarbonate. The results are given in Tables 3 and 4. An increase is observed in the amount of Cd and Pb filtered out by the bag filter, indicating an improvement in the capture of these metals due to the flue gas purification process according to the invention.

The invention claimed is:

1. A process for treating substances contaminated by heavy metals, according to which a calcium phosphate thixotropic gel is produced and is brought into contact with the contaminated substances.

2. The process according to claim 1, comprising the following steps:
using a source of calcium carbonate and a source of phosphate ions in water in a weight ratio that is controlled so as to obtain a Ca/P ratio between 1.4 and 1.8;
reacting the calcium carbonate with the phosphate ions at a pH between 2 and 10 and with controlled stirring to produce a calcium phosphate gel; and
bringing this calcium phosphate gel into contact with the contaminated substances.

3. The process according to claim 2, wherein the calcium phosphate gel has a viscosity of at least 100 cps.

4. The process according to claim 2, wherein the stirring time and intensity are adapted in order to obtain a gel which is solidified when the stirring is stopped.

5. A process for treating substances contaminated by heavy metals, comprising the following steps:
using a source of calcium carbonate and a source of phosphate ions in water in a weight ratio that is controlled so as to obtain a Ca/P ratio between 1.4 and 1.8;
reacting the calcium carbonate with the phosphate ions at a pH between 2 and 10 and with controlled stirring to produce a calcium phosphate gel, wherein all the reactants are mixed from the start of the stirring and wherein the pH is allowed to change to its natural value, and
brining said calcium phosphate gel into contact with the contaminated substances.

6. The process according to claim 2, wherein the source of calcium carbonate is a precipitated calcium carbonate (PCC), or a natural mineral selected from the group consisting of chalk, marble, and dolomite.

7. The process according to claim 2, wherein the source of calcium carbonate comprises waste from a soda ash factory.

8. The process according to claim 2, wherein the source of calcium carbonate is in the form of a powder having an average particle diameter below 300 μm.

9. The process according to claim 2, wherein the source of phosphate ions is potassium or sodium hydrogen phosphate, or phosphoric acid.

10. The process according to claim 2, wherein the calcium phosphate gel is dispersed in flue gases containing heavy metals at a temperature above 100° C., the resulting mixture then being filtered.

11. The process according to claim 2, wherein the calcium phosphate gel is mixed in a liquid effluent containing heavy metals for a sufficient duration so that the calcium phosphate absorbs the heavy metals, and the mixture is clarified in order to produce a liquid that is purified of heavy metals on the one hand, and calcium phosphate loaded with heavy metals on the other hand, which are separated.

12. The process according to claim 2, wherein the calcium phosphate gel is injected into a solid residue or into a soil in the vicinity of heavy metals.

13. The process according to claim 5, wherein the calcium phosphate gel has a viscosity of at least 100 cps.

14. The process according to claim 5, wherein the stirring time and intensity are adapted in order to obtain a gel which is solidified when the stirring is stopped.

15. The process according to claim 5, wherein the source of calcium carbonate is a precipitated calcium carbonate (PCC), or a natural mineral selected from the group consisting of chalk, marble, and dolomite.

16. The process according to claim 5, wherein the source of calcium carbonate comprises waste from a soda ash factory.

17. The process according to claim 5, wherein the source of calcium carbonate is in the form of a powder having an average particle diameter below 300 μm.

18. The process according to claim 5, wherein the source of phosphate ions is potassium or sodium hydrogen phosphate, or phosphoric acid.

19. The process according to claim 5, wherein the calcium phosphate gel is dispersed in flue gases containing heavy metals at a temperature above 100° C., the resulting mixture then being filtered.

20. The process according to claim 5, wherein the calcium phosphate gel is mixed in a liquid effluent containing heavy metals for a sufficient duration so that the calcium phosphate absorbs the heavy metals, and the mixture is clarified in order to produce a liquid that is purified of heavy metals on the one hand, and calcium phosphate loaded with heavy metals on the other hand, which are separated.

21. The process according to claim 5, wherein the calcium phosphate gel is injected into a solid residue or into a soil in the vicinity of heavy metals.

* * * * *